United States Patent Office 3,729,472
Patented Apr. 24, 1973

3,729,472
PROCESSES FOR PREPARING CERTAIN
PYRIMIDINES
Kenji Ikawa, Osaka-shi, and Fumitaka Takami, Higashi-
osaka-shi, Japan, assignors to Shionogi & Co., Ltd.,
Osaka, Japan
No Drawing. Filed Aug. 19, 1970, Ser. No. 65,260
Claims priority, application Japan, Aug. 20, 1969,
44/66,130
Int. Cl. C07d 51/42
U.S. Cl. 260—256.5 R          5 Claims

ABSTRACT OF THE DISCLOSURE 2-methyl - 4 - amino - 5 - aminomethylpyrimidine is converted into N,N - dimethyl-N'-(2-methyl-4-amino-5-pyrimidinyl)-formamidine by the treatment with dimethylformamide diethylacetal. The formamidine is heated to give 7 - methyl - 3,4-dihydropyrimido-(4,5-d)pyrimidine. The formamidine or the pyrimido-pyrimidine is treated with hydrogen sulfide or water to give 2-methyl-4-amino-5-thioformamino-methylpyrimidine or 2-methyl-4-amino-5-formamino-methylpyrimidine.

BACKGROUND OF THE INVENTION

Field of the invention

The present invention generally relates to methods for preparing pyrimidine derivatives. More particularly, it concerns novel process for preparing 2-methyl-4-amino-5 - formaminomethylpyrimidine or 2 - methyl-4-amino-5-thioformaminomethylpyrimidine which are equally important intermediates for synthesizing thiamine, and that for N,N - dimethyl-N'-(2-methyl-4-amino-5-pyrimidinyl)-formamidine or 7-methyl-3,4-dihydropyrimido(4,5-d)pyrimidine, the precursor therefor.

Description of prior art

2 - methyl - 4 - amino-5-thioformaminomethylpyrimidine has hitherto been prepared by, for instance, treating 2 - methyl - 4-aminomethylpyrimidine with potassium dithioformate (Matsukawa: Yakugaku Zasshi, 62, 417 (1942)). The method, however, is not practical because of the very hygroscopic nature and the offensive odor of the potassium dithioformate used. It is not satisfactory in the yield of the product as well as the difficulty of handling the reagent. Although 2-methyl-4-amino-5-thioformaminomethylpyrimidine can also be obtainable by treating 2 - methyl - 4-amino-5-formaminomethylpyrimidine with phosphorous pentasulfide in toluene, this process is likewise not practical because of the low solubility of the starting material in the solvent which results in very low yield.

Moreover, although a method for treating 2-methyl-4-amino-5-aminomethylpyrimidine with formic acid has been known as a process for preparing 2-methyl-4-amino-5-formaminomethylpyrimidine, the process requires large quantity of heat and has a drawback of contaminating the product with metal because lead oxide is used as an agent for decomposing the formic acid. It is therefore not practical.

SUMMARY OF THE INVENTION

It is therefore the primary object of the present invention to provide a process for preparing 2-methyl-4-amino - 5 - thioformaminomethylpyrimidine or 2-methyl-4-amino - 5 - formaminomethylpyrimidine obviating the above described drawbacks. It is another object of the present invention to provide a process for preparing N,N-dimethyl - N' - (2-methyl-4-amino-5-pyrimidinyl)-formamidine or 7 - methyl-3,4-dihydropyrimido(4,5-d)pyrimidine, the precursors for the firstly mentioned compounds.

It is a further object of the present invention to provide a commercially advantageous process composed of a series of sequential steps from 2-methyl-4-amino-5-aminomethylpyrimidine to 2-methyl-4-amino-5-thioformaminomethylpyrimidine or 2 - methyl - 4-amino-5-formaminomethylpyrimidine.

Other objects and attendant advantages of the present invention will be made apparent to those who are skilled in the art to which the present invention pertains by the following detailed disclosure in the specification and the appended claims.

DESCRIPTION OF THE PREFERRED EMBODIMENT

According to the present invention, N,N-dimethyl-N'-(2-methyl - 4 - amino - 5-pyrimidinyl)-formamidine [III] is obtained almost quantitatively by treating the starting material, 2 - methyl - 4-amino-5-aminomethylpyrimidine [I] with dimethylformamide dialkylacetal [II] at low temperature in its first step. 7-methyl-3,4-dihydropyrimido (4,5-d)pyrimidine [IV] is obtainable by simply heating the formamidine [III]. Moreover, the formamidine [III] or the pyrimidopyrimidine [IV], or the mixture thereof can easily give 2-methyl-4-amino-5-thioformaminomethylpyrimidine [V] or 2-methyl-4-amino-5-formaminomethylpyrimidine [V'] by an action of hydrogen sulfide or water. The reaction of each the stages of the present process proceeds at low temperature with simple operation and the yields of the respective stages are high enough. Furthermore, since the reaction mixture of the first step can be transferred to a subsequent step without difficult separation of the reaction products, the process can easily be embodied in either of batch or continuous operation, and this is an advantage from a practical point of view together with said quantitative yields of the steps.

These reactions may be explained on the basis of the following mechanisms postulated below.

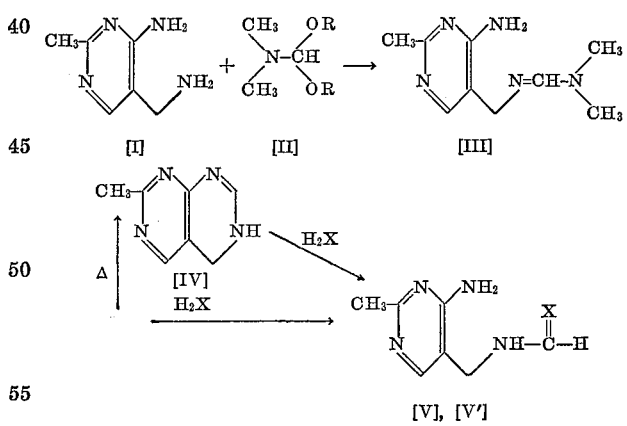

wherein, R represents a methyl group or an ethyl group and X represents an oxygen atom or a sulfur atom.

The product [V] of the present invention easily gives thiamine upon the treatment with γ-aceto-δ-chloropropyl acetate whereas the product [V'] gives the same upon that with γ-aceto-γ-mercaptopropyl acetate.

In the following paragraphs, the present invention will be illustrated in more detail by way of example.

EXAMPLE 1

Preparation of N,N-dimethyl-N'-(2-methyl-4-amino-5-
pyrimidinyl)-formamidine [III]

A solution of 706 mg. (1.2 mols) of dimethylformamide diethylacetal [II] in 4 ml. of methanol was added dropwise to a solution of 552 mg. (1 mol) of 2-methyl-4-aminomethylpyrimidine [I] in 8 ml. of absolute ethanol for 30 minutes while being ice-cooled and stirred. The mixture was thereafter allowed to react for 30 minutes at 0–5° C. and for additional 30 minutes at 5–10° C. (the first step of the process). The UV spectrum (ethanol) of the reaction mixture has maximum absorptions ($\lambda_{max.}$) at 228 m$\mu$ and 282 m$\mu$. A portionwise addition of ethanol solution containing 1 g. of hydrochloric acid to the mixture was effected to precipitate white crystals while being ice-cooled and stirred. The filtration of these crystals gave 920 mg. (86.8%) of N,N-dimethyl-N'-(2-methyl-4-amino-5-pyrimidinyl)-formamidine [III]. The crystals are very hygroscopic and have not been described in the literature. Recrystallization of this product from methanol under desiccating condition afforded colorless needles of M.P. 196–198° C. (to decompose).

$IR_{max.}^{Nujol}$ cm.$^{-1}$: 2620 (N$^+$—H), 1710–1690 (C=N$^+$)

UV (99% EtOH) $\lambda_{max.}$ m$\mu$: 212, 234 (sh.)

NMR ($d_6$-DMSO) $\tau$: 7.45$^s$ ($-CH_3$), 6.88$^s$ (3H), 6.80$^s$ (3H)

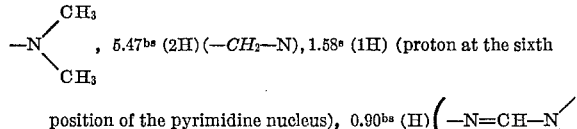

5.47$^{bs}$ (2H) ($-CH_2-N$), 1.58$^s$ (1H) (proton at the sixth position of the pyrimidine nucleus), 0.90$^{bs}$ (H) ($-N=CH-N$)

EXAMPLE 2

Preparation of 7-methyl-3,4-dihydropyrimido (4,5-d)-pyrimidine [IV]

A reaction similar to that as described in Example 1 was performed with the same reagents of the identical quantities until it completed the first step. The maximum absorptions of UV spectrum of the reaction mixture shifted to 210, 228 (sh.) and 296 m$\mu$ after it had further been stirred for one hour at 70° C. Removal of the solvent by evaporation under reduced pressure and subsequent washing of the obtained crystalline residue with absolute ether gave 414 mg. of white crystals of M.P. 168–174° C. (to decompose). Condensation of the mother liquor in similar manner and washing with ether likewise gave 100 mg. of white crystals. Total yield: 87%. Recrystallization of these white crystals from acetonitrile afforded colorless needles of the compound [IV] of M.P. 195–197° C.

*Analysis.*—Calcd. for $C_7H_8N_4$ (percent): C, 56.74; H, 5.44; N, 37.82. Found (percent): C, 56.96; H, 5.49; N, 37.89.

UV (99% EtOH) $\lambda_{max.}$ m$\mu$: 206, 299

NMR ($d_6$-DMSO) $\tau$: 7.60$^s$ (3H) ($-CH_3$), 5.47$^s$ (2H) ($-CH_2-N$), 2.75$^s$ (1H) (hydrogen atom at the sixth position of the pyrimidine nucleus), 1.98 (1H) ($-N=CH-N<$)

EXAMPLE 3

Preparation of 2-methyl-4-amino-5-thioformaminomethylpyrimidine [V] (1)

A reaction similar to that described in Example 1 was performed with the same reagents of the identical quantities until the first step of the process was completed.

Into the obtained reaction mixture, there was introduced hydrogen sulfide gas after it had been ice-cooled again until white crystals began to precipitate, and the mixture then stood overnight at room temperature.

When the precipitated crystals were filtered out and the mother liquor was condensed under reduced pressure, crystals were again precipitated. Suspension washing of the crystals with ethanol and subsequent filtration afforded 690 mg. (95%) of colorless scales of M.P. 183–185° C. (to decompose). The product was identified as the compound [V] by comparing its IR spectrum with that of an authentic sample and by mixed melting.

EXAMPLE 4

Preparation of 2-methyl-4-amino-5-thioformaminomethylpyrimidine [V] (2)

An almost identical reaction to that described in Example 3 was performed. In this case, however, the reaction mixture was heated for 1 hour at 70° C. before introducing the hydrogen sulfide gas, and the formation of pyrimidopyrimidine [IV] was confirmed by the shift of the maximum absorption in UV spectrum to 210, 228 (sh.) and 296 m$\mu$. The reaction subsequent to the confirmation resulted in the obtention of 706 mg. (97%) of colorless scales of the compound [V].

EXAMPLE 5

Preparation of 2-methyl-4-amino-5-formaminomethylpyrimidine [V'] (1)

A reaction similar to that described in Example 1 was performed with the same reagents of the identical quantities until the first step of the process was completed. The reaction mixture was then added with 1 g. of water, and the combined mixture was stood still for 48 hours at room temperature. The solvent in the mixture still thereafter removed by evaporation under reduced pressure to dryness. Washing of the obtained residue with ethanol and filtration gave 500 mg. (74%) of white crystals. Recrystallization of this product from ethanol afforded colorless needles of M.P. 225° C. (to decompose), which was identified as the compound [V'] by comparing its IR spectrum with that of an authentic sample and by mixed melting.

EXAMPLE 6

Preparation of 2-methyl-4-amino-5-formaminomethylpyrimidine [V'] (2)

After preparing the pyrimidopyrimidine [IV] in a similar manner as described in Example 4, the reaction mixture was treated in the same way as described in the latter half of Example 5 to give 470 mg. (70%) of white crystals. Recrystallization of this product from ethanol afforded colorless needles of M.P. 225° C. (to decompose) which was identified as the compound [V'] by comparing its IR spectrum with that of an authentic sample and by mixed melting.

We claim:

1. Process for preparing N,N-dimethyl-N'-(2-methyl-4-amino-5-pyrimidinyl)-formamidine which comprises reacting 2-methyl-4-amino-5-aminomethylpyrimidine with dimethylformamide dialkylacetal at about 0–10° C. for about one hour.

2. Process for preparing 2-methyl-4-amino-5-thioformaminomethylpyrimidine which comprises reacting N,N'-dimethyl-N-(2-methyl-4-amino - 5 - pyrimidinyl)-formamidine with hydrogen sulfide while cooling the reaction for a time sufficient for crystals of said formamidine to precipitate.

3. Process for preparing 2-methyl-4-amino-5-formaminomethylpyrimidine which comprises reacting N,N'-dimethyl - N' - (2 - methyl-4-amino-5-pyrimidinyl)-formamidine with water at room temperature for about 48 hours.

4. Process for preparing 2-methyl-4-amino-5-thioformaminomethylpyrimidine which comprises reacting 2-methyl-4-amino-5-aminomethylpyrimidine with dimethylformamide dialkylacetal at about 0–10° C. for about one hour and treating the obtained product with hydrogen sulfide while cooling the reaction for a time sufficient for the crystals of said pyrimidine to precipitate.

5. Process for preparing 2-methyl-4-amino-5-formaminomethylpyrimidine which comprises reacting 2-methyl-4-amino-5-aminomethylpyrimidine with dimethylformamide dialkylacetal at about 0–10° C. for about one hour and treating the obtained product with water at room temperature for about 48 hours.

References Cited

UNITED STATES PATENTS 3,472,850  10/1969  Tsurushima et al. __ 260—256.4 N

ALEX MAZEL, Primary Examiner

R. J. GALLAGHER, Assistant Examiner

U.S. Cl. X.R.

260—256.4 N, 256.4 F